(12) United States Patent
Aboukhalil et al.

(10) Patent No.: US 6,175,748 B1
(45) Date of Patent: Jan. 16, 2001

(54) METHODS AND APPARATUS FOR DETERMINATION OF A POWER LEVEL IN AN RF BOOSTER FOR WIRELESS COMMUNICATIONS

(75) Inventors: Joseph C. Aboukhalil, Franklin Park; Boris Aleiner, Somerset; Boris A. Bark, Ocean Township, all of NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/020,555

(22) Filed: Feb. 9, 1998

(51) Int. Cl.[7] .................................................. H04B 1/38
(52) U.S. Cl. ............................................ 455/571; 455/575
(58) Field of Search .............................. 455/99, 571, 127, 455/575, 249.1, 74.1, 126; 340/623, 624, 618

(56) References Cited

U.S. PATENT DOCUMENTS

| | | | | |
|---|---|---|---|---|
| 5,146,614 | * | 9/1992 | Furuno | 455/89 |
| 5,471,654 | * | 11/1995 | Okazaki et al. | 455/126 |
| 5,493,707 | * | 2/1996 | Kamitani | 455/127 |
| 5,507,016 | * | 4/1996 | Okuhara | 455/126 |
| 5,585,786 | * | 12/1996 | Clark et al. | 340/623 |
| 5,659,893 | * | 8/1997 | Enoki et al. | 455/126 |
| 5,901,346 | * | 5/1999 | Stengel et al. | 455/126 |

* cited by examiner

Primary Examiner—Reinhard J. Eisenzopf
Assistant Examiner—Naghmeh Mehrpour
(74) Attorney, Agent, or Firm—Law Offices of Peter H. Priest, PLLC

(57) ABSTRACT

A booster for amplifying the signal of a mobile unit of a cellular telephone system. The booster includes a level determination device which produces a reference level based on a power level of a signal received from the mobile unit. The level determination device includes a step voltage circuit which produces a step voltage based on the power level of the signal received from the mobile unit. The step voltage is supplied to a resulting voltage circuit which produces a resulting voltage based on the step voltage, the resulting voltage suitably providing a reference level for the booster.

17 Claims, 3 Drawing Sheets

METHODS AND APPARATUS FOR DETERMINATION OF A POWER LEVEL IN AN RF BOOSTER FOR WIRELESS COMMUNICATIONS

FIELD OF THE INVENTION

The present invention relates generally to improvements in wireless communications. More particularly, the present invention relates to methods and apparatus for determination of a power level in an RF booster for wireless communications.

BACKGROUND OF THE INVENTION

Cellular telephone systems are widely used in a variety of applications and locations, including for communication from automobiles. In order to provide the greatest possible portability, the handset, or Personal Station, of a cellular telephone system is typically self-contained, receiving power from its own internal battery. The power provided by the battery is limited, particularly due to the need for a small battery in order to reduce the size and weight of the Personal Station.

In order to increase the operational power of the Personal Station, many users install booster stations in their automobiles. A further advantage of such an installation is that it takes advantage of the electrical power produced by the automobile. This increased power can greatly extend the range of the Personal Station.

According to the standards governing cellular equipment, all Personal Stations are classified according to the level of RF power they transmit. The goal of the booster's design is to convert the Personal Station (usually a Class II unit) into a higher class (usually a Class I) combination. At the same time, according to the same standards, each class of Personal Stations is divided into a number of power levels. To meet the standards requirements, the booster has to provide a required value of output power for each power level.

In order to keep an RF signal at a predetermined level, the value of the output RF is typically converted to a DC voltage. This voltage is applied to a first input of an operational amplifier. The second input of the operational amplifier is kept at a constant reference level voltage. Under these conditions, the signal from the output of the operational amplifier is controlled as necessary. In order for this system to operate, the power level of the input signal supplied to the first input of the operational amplifier must be supplied or predetermined. The reference level at the second input of the operational amplifier is chosen to correspond to that power level.

If the level of the RF input signal changes, the operational amplifier reference level should change accordingly. Thus, each of the RF output power levels should have a specific corresponding DC value to be used as an operational amplifier reference level.

In RF boosters of the prior art, the operational amplifier reference level is set by the Personal Station. This has the advantage of simplicity of implementation, as the level information is readily available from the Personal Station. However, setting the reference level at the Personal Station makes the booster dependent on a specific telephone model. It is difficult to adapt the booster to other types of telephones. Moreover, setting the reference level at the Personal Station provides the values of the "desired" signal. There is no provision to make sure that the RF signal transmitted by the Personal Station actually reaches the input of the booster.

There exists, therefore, a need in the art for a booster in which the reference level is easily adaptable to different types of telephones, and which provides that the signal transmitted by the Personal Station reaches the input of the booster.

SUMMARY OF THE INVENTION

In one aspect, the invention may suitably comprise a booster which sets a DC reference level of an operational amplifier according to a power level of an RF signal received from a mobile station. The booster includes a level determination device receiving as an input a signal derived from the RF signal produced by a mobile station. The level determination device produces a DC voltage which is supplied to the reference input of an operational amplifier. The operational amplifier also has a variable input which is received from the output RF signal of a mobile station. The output of the operational amplifier is supplied as an input of a variable attenuator, which supplies its output to an RF power amplifier.

The level determination device may suitably include a step voltage circuit receiving an input corresponding to the input RF signal of the mobile station. The step voltage circuit produces a plurality of outputs, with the input determining how many outputs are set at a step voltage and how many outputs are set at a zero voltage. The output of the step voltage circuit is supplied to a resulting voltage circuit which sums the voltages to determine an output level.

A more complete understanding of the present invention, as well as further features and advantages of the invention, will be apparent from the following Detailed Description and the accompanying drawings.

DETAILED DESCRIPTION

Figure 1:
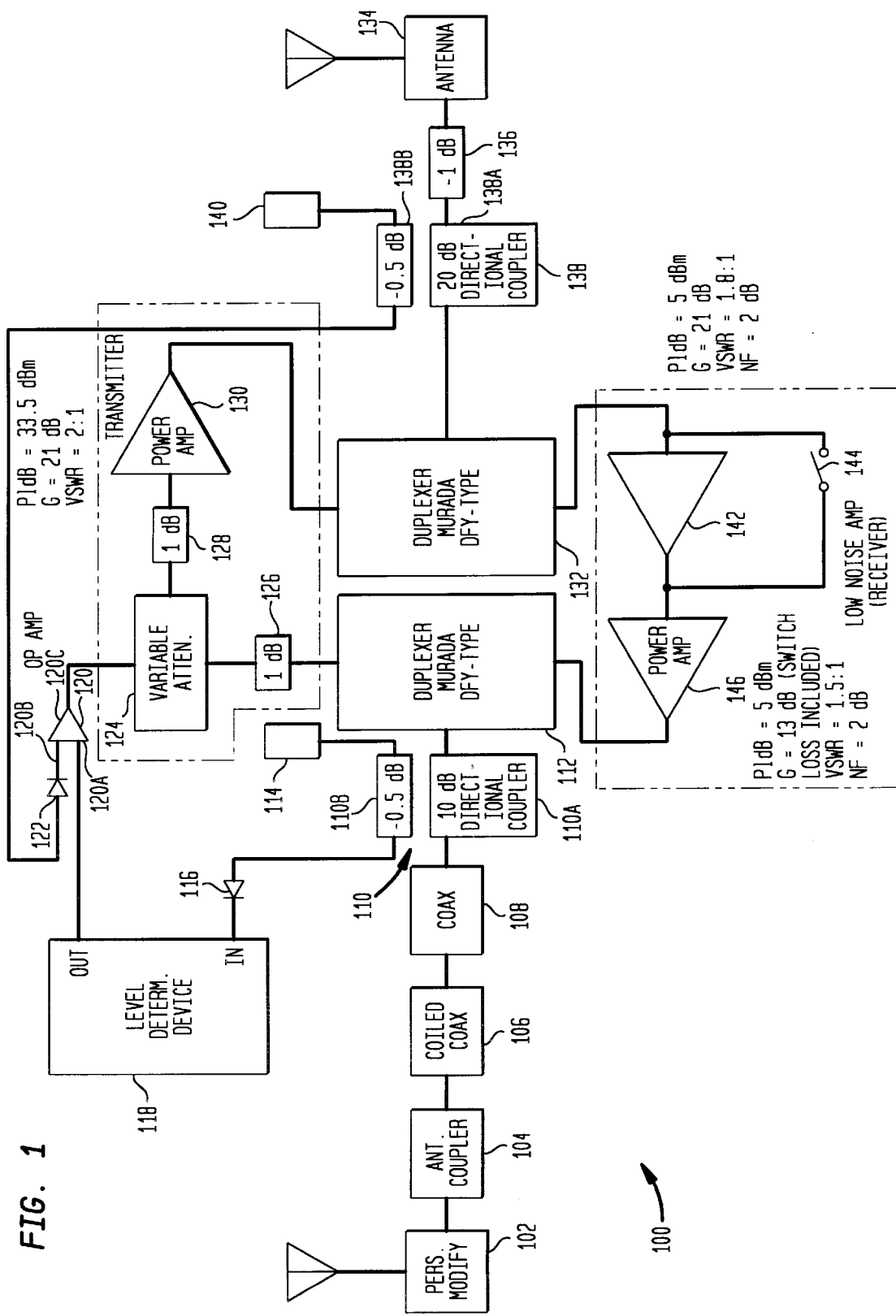
FIG. 1 is a diagram illustrating a booster according to an aspect of the present invention.

FIG. 1 illustrates an RF booster 100 according to the present invention. The RF booster receives a signal from a personal station 102, the signal being routed to an antenna coupler 104, from the antenna coupler 104 to a coiled coaxial cable 106, and from the coiled coaxial cable 106 to a 12-foot coaxial cable 108. The antenna coupler 104, the coiled coaxial cable 106, and the 12-foot coaxial cable 108 each attenuate the signal from the personal station 102 by a predetermined amount, the amount of attenuation being determined during the design of the booster 100. The signal from the personal station 102 is routed from the 12-foot coaxial cable 108 to a first directional coupler 110, the first directional coupler 110 having first and second elements 110A and 110B. The first element 110A passes the personal station signal to a first input 112A of a first duplexer 112. The first duplexer 122 also has a second input 112B and an output 112C. The second element 110B is connected to a matched load 114 on a first side and to the input of a first detector diode 116 on a second side. The detector diode 116 is preferably a Schottky diode. The output of the first detector diode 116 passes the personal station signal to the input of a level determination device 118. The output of the level determination device 118 is connected to a reference input 120A of an operational amplifier 120. The operational amplifier 120 receives as a variable input 120B an output of a second detector diode 122, which is preferably a Schottky diode. The operational amplifier 120 provides an output 120C. The output 120C of the operational amplifier 120 is supplied as a first input to a variable attenuator 124. The variable attenuator receives a second input from a first fixed attenuator 126, which passes an attenuated output from the first duplexer 112. The variable attenuator 124 supplies an output to a second fixed attenuator 128, which passes the output of the variable attenuator 124 to a first power amplifier 130. The first power amplifier 130 supplies its output to a first input of a second duplexer 132. The booster 100 preferably operates on separate frequencies for transmission and reception. Duplexers 112 and 132 serve to filter the different frequencies for transmission and reception to separate transmit and receive signals. The booster 100 also includes an antenna 134, which is connected through a coax cable 136 to a second directional coupler 138. The directional coupler 138 has a first element 138A and a second element 138B. the first element 138A is connected to a second input of the second duplexer 132. The second element 138B is connected at a first side to a matched load 140 and at a second side to an input of a second directional diode 122. The output of the second duplexer 132 is supplied to an input of a second amplifier 142. The output of the second amplifier 142 is supplied to an input of a third amplifier 146, which provides an output as a second input of the first duplexer 112. The second amplifier 142 and the third amplifier 146 together comprise a low noise amplifier 148 which serve as a receiver.

The level determination device 118 develops a voltage in accordance with the level of input voltage at its input, and supplies this voltage at the reference input 120A of the operational amplifier 120. The operational amplifier 120 produces an output 120C based on the difference between its reference input 120A and its variable input 120B. If the reference input 120A and the variable input 120B are identical, the operational amplifier 120 produces no output.

If the voltage at the second directional coupler 138 is higher than the reference level of the operational amplifier 120, the operational amplifier 120 will produce a positive output and the variable attenuator will increase attenuation. If the voltage at the second directional coupler 138 is lower than the reference level of the operational amplifier 120, the operational amplifier 120 will produce a negative output and the variable attenuator will decrease attenuation. The booster 100 therefore responds to the power level received from the base station at the antenna 134, provided that the reference level of the operational amplifier 120 is set appropriately.

The power requirements, and therefore the preferable power setting, are different depending on the distance of the booster 100 and personal station 102 from the base station. Therefore, the base station typically sends commands to the personal station 102 for adjustment of the power level. In boosters of the prior art, the personal station issued a command to a prior-art booster to set the power level of the booster in accordance with the power level command issued by the base station to the personal station. This adds additional complexity due to the necessity to equip the booster with circuitry needed to read the power level commands issued by the personal station, and also introduced problems when the personal station failed to respond appropriately to a power level change command from the base station. In such instances, a personal station could receive a power level change command from the base station and instruct the booster to set the required power level. In some cases the base station would then fail to set its own commanded power level. In such a case, the booster would be set at the commanded power level while the base station would not, causing a mismatch between the power level settings of the base station and the personal station.

A booster 100 according to the present invention senses the personal station power setting directly from the personal station 102 and sets the power setting of the booster 100 accordingly. There is no need for circuitry to read a power level change command, and much less chance of a mismatch than with boosters of the prior art. Because the booster 100 senses the power level of the personal station 102, the booster 100 will follow the power setting of the personal station 102, even if the personal station 102 fails to respond properly to the commands of the base station. Moreover, because the booster 100 directly senses the power level of the personal station 102 and adapts accordingly, the booster 100 is easily adaptable to a wide variety of telephone types.

The reference input 120A of the operational amplifier 120 must have its own value for each corresponding RF power level and also must remain constant over each power level. Persons skilled in the art will realize that the use of an analog-to-digital converter as the level determination device 118 will satisfy these requirements. Analog-to-digital converters are expensive, however. It is therefore advantageous to implement the level determination device 118 using alternative components.

Figure 2:
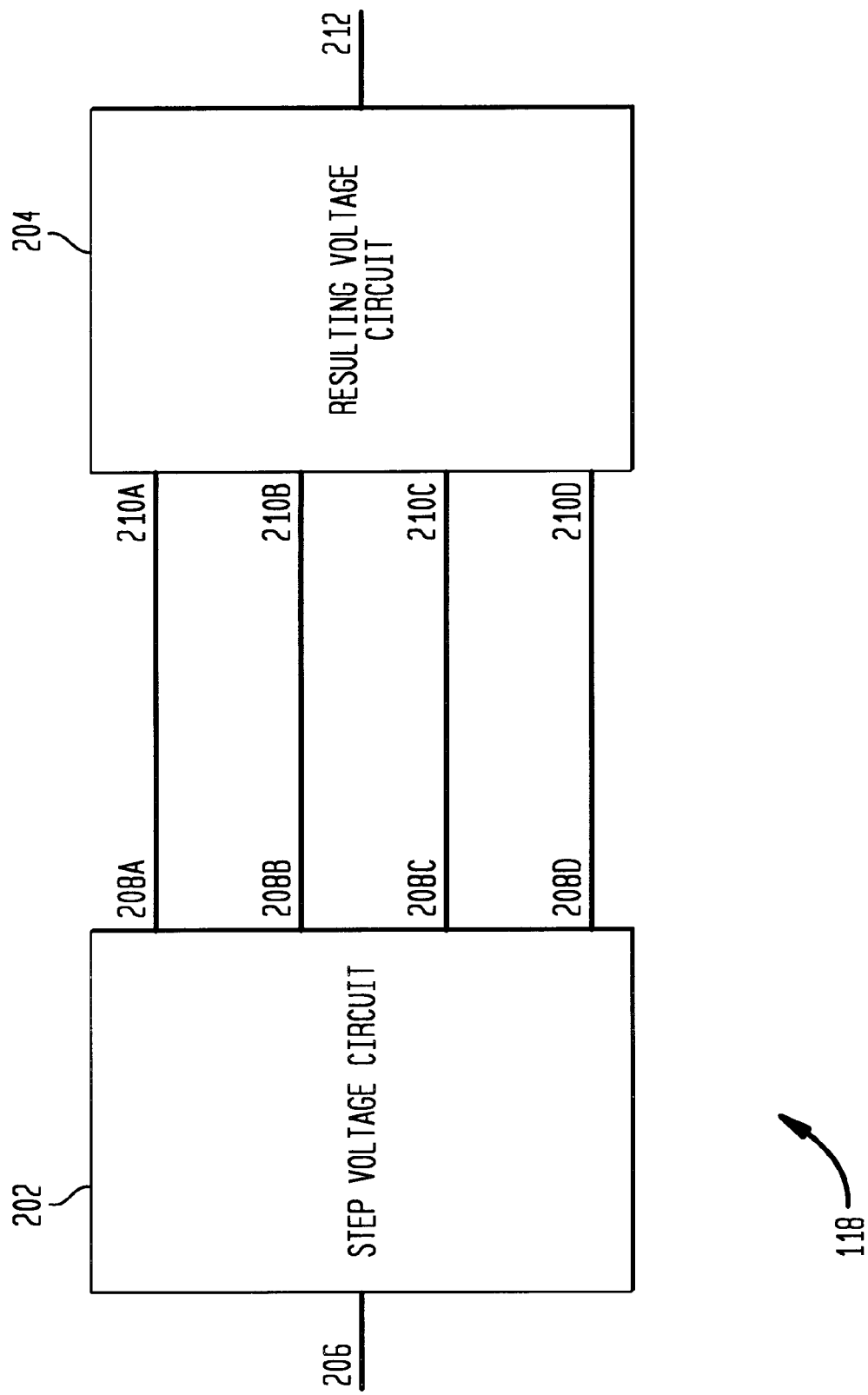
FIG. 2 is a diagram illustrating additional details of a level determination device according to one aspect of the present invention.

FIG. 2 is a diagram illustrating an implementation of level determination device 118 shown in FIG. 1. Level determination device 118 includes a step voltage circuit 202 and a resulting voltage circuit 204. Step voltage circuit 202 includes an input 206 and four outputs 208A–D. Input 206 of step voltage circuit 202 receives a DC voltage from the output 106A of first detector diode 116. Each of the outputs 208A–D of resulting voltage circuit 204 takes a zero level or a high voltage level, depending on input 206. The higher the level received at input 206, the more of outputs 208A–D take a high voltage level. The outputs 208A–D of step voltage circuit 202 are provided as inputs 210A–D of resulting voltage circuit 204. Resulting voltage circuit 204 sums the voltage levels received at its inputs 210A–D to produce at its output 212 a DC step voltage, which is used as the output of the level determination device 118.

The step voltage circuit 202 develops a step voltage corresponding to the RF input power level. This is done by comparing the input DC voltage to a set of threshold voltages. The input DC voltage corresponds to the input RF signal. The threshold voltages are preferably set to correspond to the limits of standard RF power levels.

The function of the step voltage circuit 202 is to develop a step voltage corresponding to the input RF power level. This is done by comparing the input DC voltage at input 206 to the set of threshold voltages. The input DC voltage corresponds to the input RF signal received by booster 100 from the mobile station. The threshold voltages are set to correspond to the limits of RF power levels.

Step voltage circuit 202 can be implemented by a number of operational amplifiers, operating as comparators. A description of a suitable configuration can be found in National Semiconductor "A Quad of Independently Functioning Comparators" Application Note AN-74, FIG. 36, "Four Variable Reference Supplies" ("AN-74"), incorporated herein by reference. As can be seen in AN-74, each of the comparators has two inputs and one output. The DC voltage corresponding to the input RF signal is applied to the first input of all of the operational amplifiers. The voltage applied to the second inputs are the threshold voltages.

The output of each of the comparators is a step function. The step is generated when the value of the input DC voltage exceeds the threshold value at any comparator. A number of step voltages are created, corresponding to a designated number of RF power level (in the inverse order). That is, one step voltage corresponds to the lowest power level (for example, level 7), two of them correspond to the next power level (for example, level 6) and so on.

Figure 3:
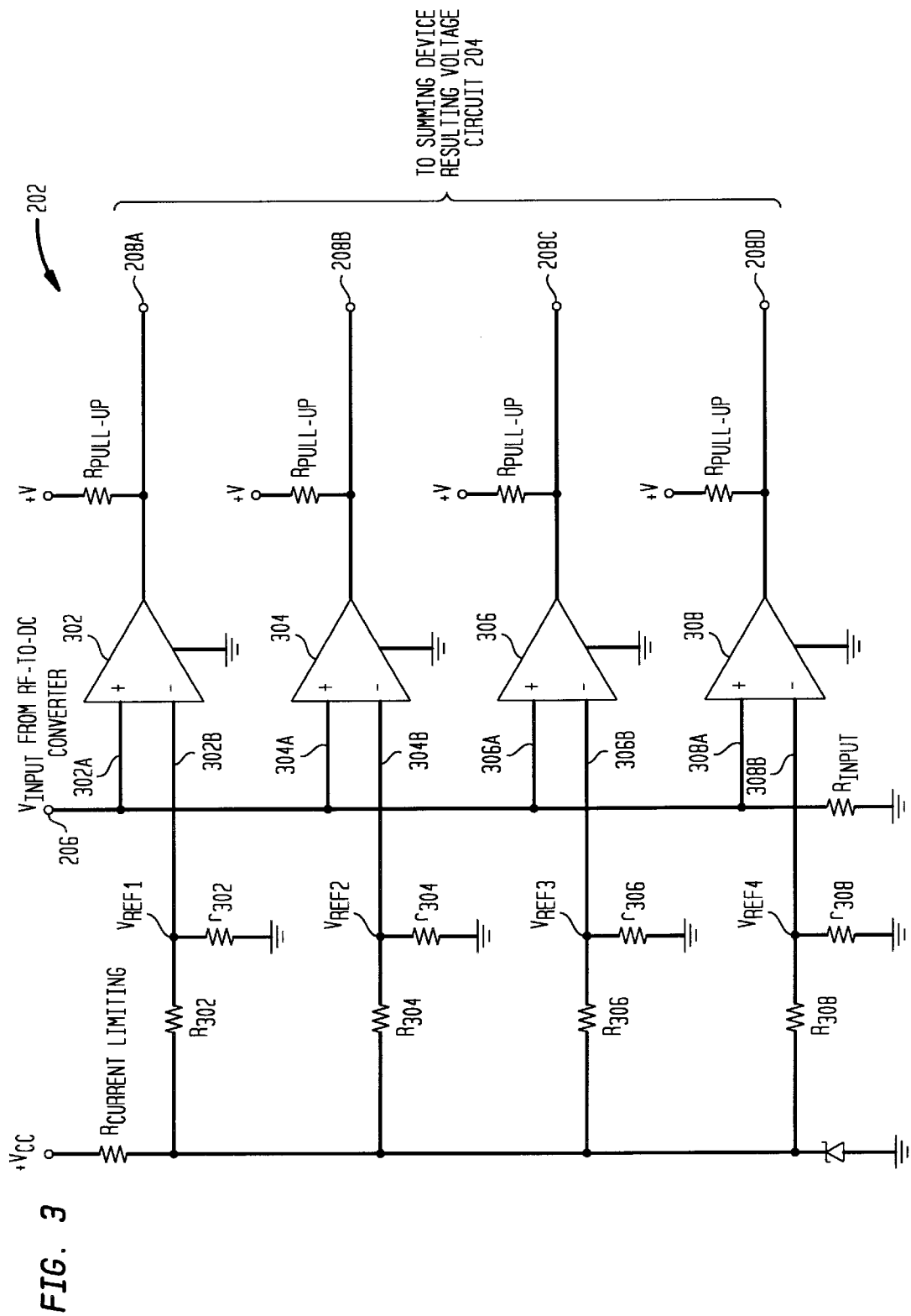
FIG. 3 is a diagram illustrating additional details of a step voltage circuit according to a further aspect of the present invention.

FIG. 3 illustrates a quad package of operational amplifiers 302, 304, 306 and 308 suitably configured for use as a step voltage circuit 202 according to the present invention. It will be recognized that the number of amplifiers is equal to the number of RF power levels. While four levels are shown, it will be recognized that larger or smaller numbers of levels may be provided as desired. Step voltage circuit 202 includes the four operational amplifiers 302, 304, 306 and 308. Each of operational amplifiers 302, 304, 306 and 308 has two inputs, 302A and 302B, 304A and 304B, 306A and 306B and 308A and 308B. Each of the inputs 302A, 304A, 306A and 308A is connected to input 206 of step voltage circuit 202. Each of inputs 302B, 304B, 306B and 308B is connected to a reference voltage $V_{REF1}$, $V_{REF2}$, $V_{REF3}$, and $V_{REF4}$, respectively. Each of the reference voltages is set to correspond to a different power level. Each of the operational amplifier outputs 208A, 208B, 208C and 208D is at a low level when a zero or low voltage is present at input 206. When a higher voltage is present at input 206, each of operational amplifier outputs 208A, 208B, 208C and 208D changes to a high level. The output 208A is at a high level when the voltage at input 302A exceeds that at input 302B. The voltage at output 208B is at a high level when the voltage at input 304A exceeds that at input 304B. The voltage at output 208C is at a high level when the voltage at input 306A exceeds that at input 306B, and the voltage at output 208D is at a high level when the voltage at input 308A exceeds that at input 308B. The reference levels at inputs 302B, 304B, 306B and 308B are preferably chosen such that additional ones of outputs 208A–D will be set at a high level as the voltage at input 206 is at higher and higher levels. Thus, there will exist voltages at input 206 at which none of outputs 208A–D are at a high level, at which output 208A is at a high level, at which outputs 208A and 208B are at high levels, at which outputs 208A, 208B and 208C are at high levels, and at which outputs 208A–D are all at high levels.

Resulting voltage circuit 204 creates a resulting voltage which is supplied to the operational amplifier 120 as a reference level. Resulting voltage circuit 204 preferably sums the step voltages created by step voltage circuit 202. Resulting voltage circuit 204 is preferably implemented by a summing amplifier, an example of which is described at National Semiconductor "An Applications Guide for Op Amps" Application Note AN-20, FIG. 4 "Summing Amplifier."

While the present invention is disclosed in the context of a presently preferred embodiment, it will be recognized that a wide variety of implementations may be employed by persons of ordinary skill in the art consistent with the above discussion and the claims which follow below.

We claim:

1. A booster for amplifying a signal from a mobile cellular telephone transceiver, comprising:

an interface for receiving the signal from the transceiver;

a level determination device for determining a power level of the signal, the level determination device being operative to receive an input based on the signal and produce an output corresponding to the power level determined for the signal;

an operational amplifier receiving a first input from an output RF signal and a second input from the output of the level determination device, the second input serving as a reference input, the operational amplifier producing an output based on a difference between the first input and the second input;

a variable attenuator receiving an input from the output of the operational amplifier and producing an output based on the input; and an RF power amplifier for producing an amplified signal based on the signal from the mobile transceiver, the RF power amplifier receiving as an input the output of the variable attenuator and producing as an output the amplified signal.

2. The booster of claim 1 further comprising a detector diode connected between the interface and the level determination device, the detector diode being operative to produce a DC voltage based on the signal received by the interface, the detector diode supplying the DC voltage to the level determination device.

3. The booster of claim 1 wherein the level determination device includes a step voltage circuit for forming a step voltage based on a threshold value, the step voltage circuit producing one of a plurality of step voltages based on a relationship between the DC voltage supplied by the detector diode and the threshold value, the level determination device further including a resulting voltage circuit receiving an input from the step voltage circuit, the resulting voltage circuit being operative to produce a resulting voltage based on the step voltage.

4. A level determination device for providing a reference voltage for use in a booster for amplifying a signal of a cellular mobile transceiver, comprising:

a step voltage circuit for forming a plurality of step voltages based on corresponding threshold values, the step voltage circuit receiving a DC voltage based on an RF signal produced by the mobile station, the step voltage circuit setting each of the plurality of step voltages to a high level if the DC voltage exceeds the threshold value corresponding to the step voltage, the threshold values having a range of values from a low value to a high value such that more of the step voltages are set to a high level if the DC voltage exceeds more of the threshold values and fewer of the step voltages are set to a high level if the DC voltage exceeds fewer of the threshold values; and a resulting voltage circuit receiving an input from the step voltage circuit, the resulting voltage circuit being operative to combine one or more step voltages received from the step voltage circuit to produce a resulting voltage based on the step voltages.

5. The level determination device of claim 4, wherein the step voltage circuit includes a plurality of comparators, each of the comparators having an independent reference level, each of the comparators producing a low voltage when the input to the step voltage circuit is below the reference level of the comparator, each of the comparators producing a high voltage when the input to the step voltage circuit is above the reference level of the comparator, the step voltage circuit producing a plurality of outputs, each output being an output of a comparator.

6. The level determination device of claim 5, wherein each of the comparators is an operational amplifier circuit.

7. The level determination device of claim 6, wherein the resulting voltage circuit includes a summing amplifier having an input connected to each of the comparators and an output based on a sum of the levels of the comparators.

8. The booster of claim 3 where the booster operates on separate frequencies for transmission and reception.

9. The booster of claim 8 wherein the step voltage circuit includes a plurality of comparators, each of the comparators having an independent reference level.

10. The booster of claim 9 wherein each of the plurality of comparators produces a low voltage when the input to the step voltage circuit is below the reference level of the comparator and a high voltage when the input to the step voltage circuit is above the reference level of the comparator.

11. The booster of claim 10 wherein the reference level of each comparator corresponds to a predetermined RF power level.

12. The booster of claim 11 wherein the step voltage circuit produces a plurality of outputs, each output being an output of a comparator.

13. The booster of claim 12 wherein the reference levels of the comparators ascend in value from lowest to highest and wherein more comparators produce a high voltage output as the voltage of the input to the step voltage circuit increases in value.

14. The booster of claim 13 wherein each of the comparators is an operational amplifier circuit.

15. The booster of claim 14 wherein the step voltage circuit comprises a single integrated circuit package comprising four independently functioning comparators.

16. The level determination device of claim 5 wherein the reference level of each comparator corresponds to a predetermined RF power level.

17. A method of signal amplification of a wireless telephone transceiver comprising the steps of:

receiving an RF signal from the transceiver;

setting a plurality of step voltages according to a power level of the RF signal received from the transceiver, each of the step voltages being set to a high level if a DC voltage corresponding to the power level of the RF signal exceeds a threshold associated with the step voltage, the thresholds having a range of values from a low to a high value such that more of the step voltages are set to a high level if the DC voltage exceeds more of the threshold values and fewer of the step voltages are set to a high level if the DC voltage exceeds fewer of the threshold values;

combining the step voltages to produce a resulting voltage corresponding to the power level of the RF signal received from the transceiver; and employing the resulting voltage as a reference voltage and producing a control signal to adjust a power amplifier to control an output of the booster, the control signal being based on a difference between the reference voltage and a variable voltage corresponding to the output of the booster.

* * * * *